(12) United States Patent
Nola

(10) Patent No.: US 9,745,925 B2
(45) Date of Patent: Aug. 29, 2017

(54) ANGLED FASTENERS

(71) Applicant: Ford Global Technologies, LLC, Dearborn, MI (US)

(72) Inventor: Gary Nola, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/008,021

(22) Filed: Jan. 27, 2016

(65) Prior Publication Data
US 2017/0211528 A1    Jul. 27, 2017

(51) Int. Cl.
F02M 35/10 (2006.01)

(52) U.S. Cl.
CPC .. F02M 35/10085 (2013.01); F02M 35/1034 (2013.01); F02M 35/10249 (2013.01)

(58) Field of Classification Search
CPC ....... F02M 35/10085; F02M 35/10249; F02M 35/1034; F02M 35/10354; F02M 35/104; F02M 35/10091; F02M 35/10144
USPC ..... 123/337, 184.21; 285/92, 363, 366, 367, 285/379, 405, 61, 62
See application file for complete search history.

(56) References Cited

U.S. PATENT DOCUMENTS

| | | | | |
|---|---|---|---|---|
| 2,230,287 A | * | 2/1941 | Curtis | F16L 55/172 138/99 |
| 3,679,235 A | * | 7/1972 | Faccou | F16L 27/0828 285/14 |
| 4,279,224 A | * | 7/1981 | Szabo | F02B 75/22 123/184.32 |
| 4,520,771 A | | 6/1985 | Hayashi | |
| 5,666,930 A | * | 9/1997 | Elder | F01P 11/04 123/41.31 |
| 5,924,398 A | * | 7/1999 | Choi | F02D 9/104 123/184.21 |
| 5,988,119 A | * | 11/1999 | Trublowski | F01P 1/06 123/41.31 |
| 6,279,964 B1 | * | 8/2001 | Watts | F16L 23/032 285/179 |
| 6,354,267 B1 | * | 3/2002 | Kotchi | F02D 9/10 123/337 |
| 6,471,406 B1 | | 10/2002 | Cadle | |
| 2002/0104501 A1 | * | 8/2002 | Kawai | F02D 9/1035 123/184.21 |

(Continued)

FOREIGN PATENT DOCUMENTS

JP     11013562 A  *  1/1999
SU     1337603 A1  *  9/1987  .............. F16L 23/02

Primary Examiner — Marguerite McMahon
(74) Attorney, Agent, or Firm — Gregory P. Brown; Diana D. Brehob; Brehob Law, PLLC

(57) ABSTRACT

A joint in a system for conducting a fluid has a first duct and a second duct that is coupled together via fasteners. Typically, the fasteners are placed into tabs that are affixed to the ducts and shafts of the fasteners run in the same direction as the duct. When the ducts are plastic and the fasteners are metal, the plastic can creep more than the metal such that the joint fails to seal properly after a period of time. To avoid such a situation, a joint that has fasteners installed at an angle with respect to the ducts is disclosed. The tabs are also angled with respect to the ducts: tabs that form an obtuse angle with one of the ducts mate with tabs on the other duct that form a complementary acute angle. In one embodiment, shafts of pairs of fasteners are roughly perpendicular.

17 Claims, 2 Drawing Sheets

(56) References Cited

U.S. PATENT DOCUMENTS

| | | | | |
|---|---|---|---|---|
| 2005/0263131 A1* | 12/2005 | Tanimura | .................. | F02D 9/10 |
| | | | | 123/337 |
| 2011/0280682 A1* | 11/2011 | Egawa | ............. | F02M 35/10085 |
| | | | | 411/337 |
| 2012/0060794 A1* | 3/2012 | Born | ................ | F02M 35/10085 |
| | | | | 123/434 |

\* cited by examiner

ANGLED FASTENERS

FIELD

The present disclosure relates to fasteners in flanges or tabs associated joints in ducts through which a fluid flows.

BACKGROUND

The intake of internal combustion engines is formed from multiple pieces that are coupled together, some via welding, and some via fasteners. The fastened joints are provided to aid in assembly of the engine system and for serviceability.

Fasteners are provided to couple a joint 10, which in the example in FIG. 1 is an electronic throttle body (ETB) 12 to an intake manifold 32. Only a portion of ETB 12 and only a small portion of intake manifold 32 are shown in an exploded view in FIG. 1 of assembly 10. ETB 12 has an opening 14 that fluidly couples with opening 44 in intake manifold 32 when assembled. Three to four fasteners 22 (only 2 are shown in the cross-sectional view in FIG. 1) pass through holes 16 in ETB 12 and into threaded holes 36. Holes 16 are provided in tabs 18 that extend outwardly from the duct portion of ETB 12. ETB 12 has a circular groove 20 into which a gasket 24 is situated. When, gasket 24 is crushed by pulling ETB 12 against intake manifold 32 via fasteners 22, gasket 24 seals joint 10.

Intake manifold 32 has tabs 34 in which an insert 38 is provided that has internal threads 36 that mate with threads of fastener 22. Insert 38 has a stake 40 to prevent rotation of insert 38. Alternatively, insert 38 has a knurled or grooved outer surface to prevent rotation.

ETB 12 is made of metal and intake manifold 32 is commonly injection-molded plastic with fasteners 22 and inserts 38 being made out of a metal. Inserts 38 can be installed in intake manifold 32 by overmolding or by heating up the insert and then forcing them into holes in tabs 34 where they melt the adjacent plastic. When the plastic cools, insert 38 is captured. Either assembly technique introduces extra steps and complication and cost. And, with fastener 22 and inserts 38 being made of metal, they add more weight than the parent plastic parts.

In an effort to simplify, an alternative approach for a joint 50 in which an ETB 12 is coupled with an intake manifold 52 is shown in FIG. 2. Intake manifold, with an internal duct 54 has tabs 58 that extend outwardly. As manufactured, threaded holes 56 in tabs 58 do not exist. Threaded fasteners 26 are self tapping and form threaded holes 56 during assembly. It has been found, though, that in testing such a configuration that the threads in threaded holes 56 creep over time while the threads of metallic fastener 26 do not creep in such a way. At some point when the creep is substantial, clamping load provided by the coupling of fasteners 26 with threaded holes 56 reduces to zero. Through holes 16 in ETB 12 are provided with some additional clearance to allow proper assembly in light of manufacturing tolerance. With a nonzero clamping load, ETB 14 and intake manifold 52 are prevented from moving with respect to each other. However, when the clamping load goes to zero, the two move side-to-side, as shown by arrow 55, with respect to each other. This causes fretting of Gasket 24 and failure of joint 50 leading to leaking.

An assembly configuration in which inserts 38 are obviated that has a long service life is desired.

SUMMARY

To overcome at least one problem in the prior art an intake system for an internal combustion engine is disclosed that has an electronic throttle body (ETB). The ETB is coupled to an intake manifold with at least one fastener. The ETB has a duct with at least one coupling element extending outwardly therefrom. A through hole is defined in the coupling element of the ETB to accommodate each fastener. The intake manifold has a duct with at least one coupling element extending outwardly therefrom. The fastener passes through the through hole in the ETB and engages with threads defined in the coupling element of the intake manifold. A central axis of one of the fasteners forms an angle with a centerline of the ETB of 15 to 135 degrees.

The coupling elements extending from the duct of the ETB include a plurality of tabs arranged around the periphery of the duct of the ETB. The coupling elements extending from the duct of the intake manifold have a plurality of tabs that align with the tabs of the ETB when assembled. A fastener is provided through each tab around the periphery of the duct of the ETB.

The tabs associated with the ETB extend from the duct of the ETB such that an outer face of the tabs forms an obtuse angle with respect to the duct of the ETB proximate the tabs.

The coupling element extending from the duct of the ETB have a flange that encircles the duct and forms a surface of a conical frustrum; the coupling element extending from the duct of the intake manifold comprises a flange that encircles the duct and forms a conical frustrum; and an outer surface of the flange associated with the intake manifold mates with the flange associated with the ETB.

More generally, a joint for conducting a fluid is disclosed that includes first and second ducts each having a plurality of tabs extending outwardly from the first duct, through holes defined in the plurality of tabs associated with the first duct, and a threaded fastener inserted into at least two of the through holes. A shaft of the threaded fasteners are angled with respect to a surface of the first duct.

The angle between the shaft of the threaded fastener and the surface of first duct is in the range of 15 to 135 degrees.

In some embodiments, shafts of two of the fasteners that are located in tabs that are across the duct from each other are roughly perpendicular.

The tabs of the first duct are part of a first flange and the tabs of the second duct are part of a second flange.

The first flange forms a surface of a conical frustrum and the second flange forms a solid conical frustrum.

The first duct and the second duct are comprised of plastic and the fasteners are comprised of metal. In an alternative embodiment, the first duct is comprised of metal.

A circular groove is defined in one of the first and second joints; a circular gasket is placed in the circular groove; and the gasket is crushed when the fasteners are tightened so as to pull the first duct against the second duct.

In one embodiment, one of the first and second ducts is part of an electronic throttle body and the other of the ducts is part of an intake manifold.

A method of fabrication to form a fluid-conducting joint is disclosed. A first duct having tabs extending outwardly and through holes defined in the tabs is fabricated. And, a second plastic duct having tabs extending outwardly is fabricated. Metallic, threaded fasteners are slipped though the holes of the first duct engaging threads of the fasteners with the tabs of the second duct. Shafts of the fasteners form an acute angle with the first duct.

One of the first and second ducts has a circular groove defined in a surface of the duct that faces the other of the ducts when assembled. A circular gasket is installed into the circular groove prior to engaging the threads of the fasteners with the tabs associated with the second duct.

In some embodiments, centerlines of shafts of a pair of the fasteners are substantially perpendicular.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 2:
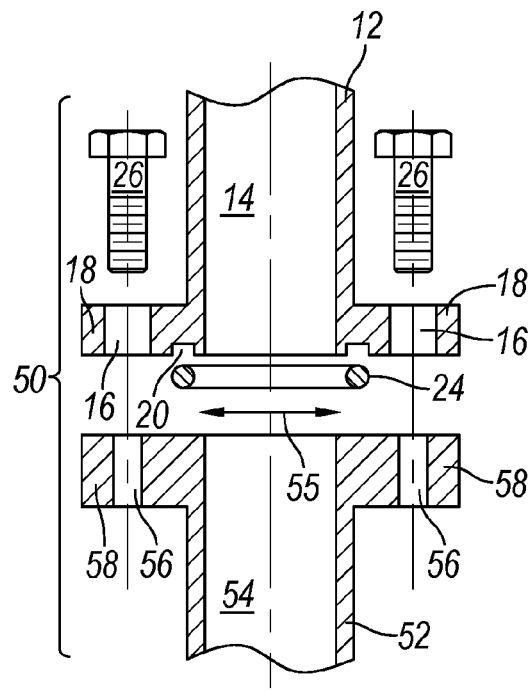
FIG. 2 is an illustration of an alternative joint for fluid-carrying ducts.
Figure 3:
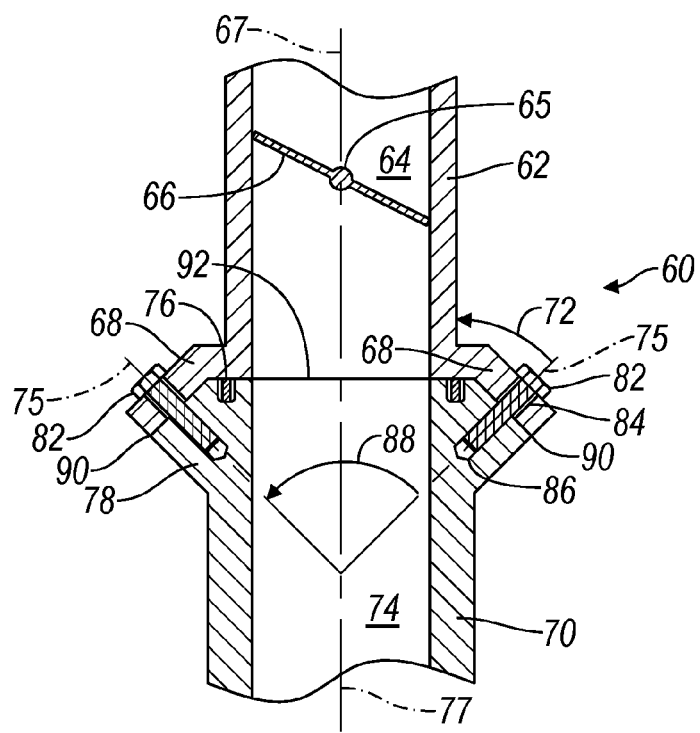
FIGS. 3 and 6 are an illustrations of alternative joints for fluid-carrying ducts according to embodiments of the disclosure.

An ETB 62 and an intake manifold 70 are shown in FIG. 3 that form a joint 60. ETB defines a duct 64 that has a centerline 67 and intake manifold 78 defines a duct 74 with a centerline 77. A butterfly or throttle valve 66 is shown in duct 64. Throttle valve 66 rotates about a pivot 65 to control flow through duct 64. ETB 62 is provided with a plurality of tabs 68 that extend outwardly from ETB 62. Tabs 68 are not normal with the walls of ETB 62. An outer face of tab 68 forms an obtuse angle 72 with the wall of ETB 62. Tabs 68 have through holes 84 through which fasteners 82 pass. Intake manifold 70 has tabs 78. Fasteners 82 are self tapping and form the threads in tabs 78. Axes 72 of fasteners 82 intersect in an angle 88 that is nearly a right angle. The right angle is non-limiting. Alternatively, the angle between axes 72 can be greater or less depending on packaging and other constraints. However, the prior art of having axes of the two fasteners parallel, or nearly so, is not suitable to solve the fretting problem identified. If intake manifold 70 is made of a plastic and fasteners 82 is made of metal, over time, creep in threads formed in the plastic may lead to a reduced clamping load. However, unlike the situation illustrated in FIG. 2 in which a back and forth motion shown by arrow 55 in FIG. 2 leads to failure of Gasket 24. Referring back to FIG. 3, a back-and-forth motion at interface 90 is not possible because the corner between 68 and the face at interface 92. Furthermore, oscillation at interface 92 would act along the axis of fastener 82.

Figure 1:
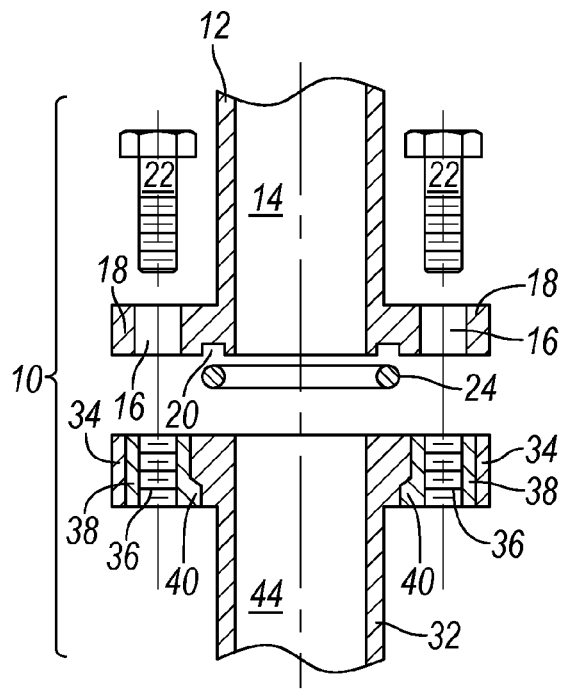
FIG. 1 is an illustration of a prior art joint for fluid-carrying ducts.
Figure 4:
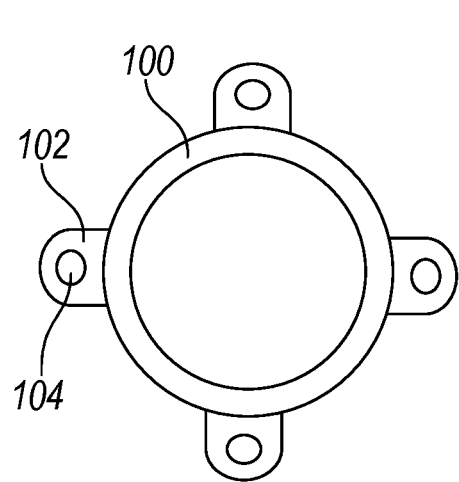
FIGS. 4 and 5 are end views of a fluid carrying joint having tabs and a flange, respectively.
Figure 5:
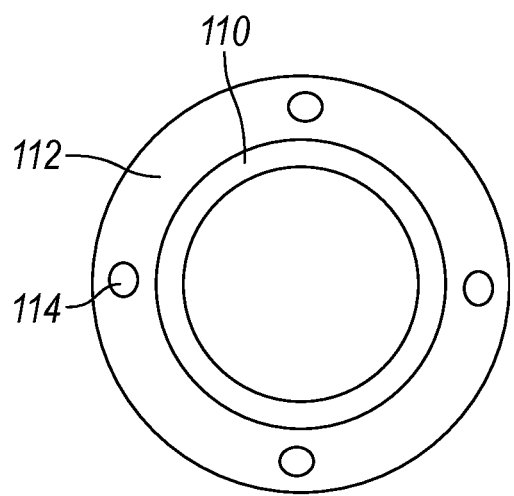

In FIGS. 1-3, the cross section is taken through two fasteners. In FIG. 4, an embodiment is shown in which four tabs 102 are provided on the periphery of wall 100. As tabs 102 are angled, i.e., not lying in the plane of FIG. 4, through holes 104 are shown as ovals. In FIG. 5, shows an alternative embodiment in which duct 110 has a flange 112 that wraps around wall 110 and has four through holes 114. Flange 112, as it is angled, forms a portion of a cone, a surface of a conical frustum. The mating duct also has a conical duct extending outwardly that can be a solid conical frustum.

(FIG. 3 shows tabs 68 and 78 of ETB 62 and intake manifold 70, respectively. If the tabs were wrapped around the ducts rather than being discrete tabs, ETB 62 would have a surface of a conical frustum extending outwardly and intake manifold would have a solid conical frustum extending outwardly.

In FIGS. 4 and 5, four evenly space holes are shown. However, fewer or more holes could be used. Furthermore, the holes may not be evenly spaced. To assure proper installation, an adjacent pair of holes may be placed at 80 degrees around the periphery of the associated duct, in a four-hole example, making it difficult to misassemble the mating parts. In an embodiment using tabs, not all of the tabs need be angled the same. This can be useful to further prevent the fretting that occurs in the prior art example in which the faces of the tabs through which the fastener passes are all parallel. Additionally, such orientation may assist in packaging.

Figure 6:
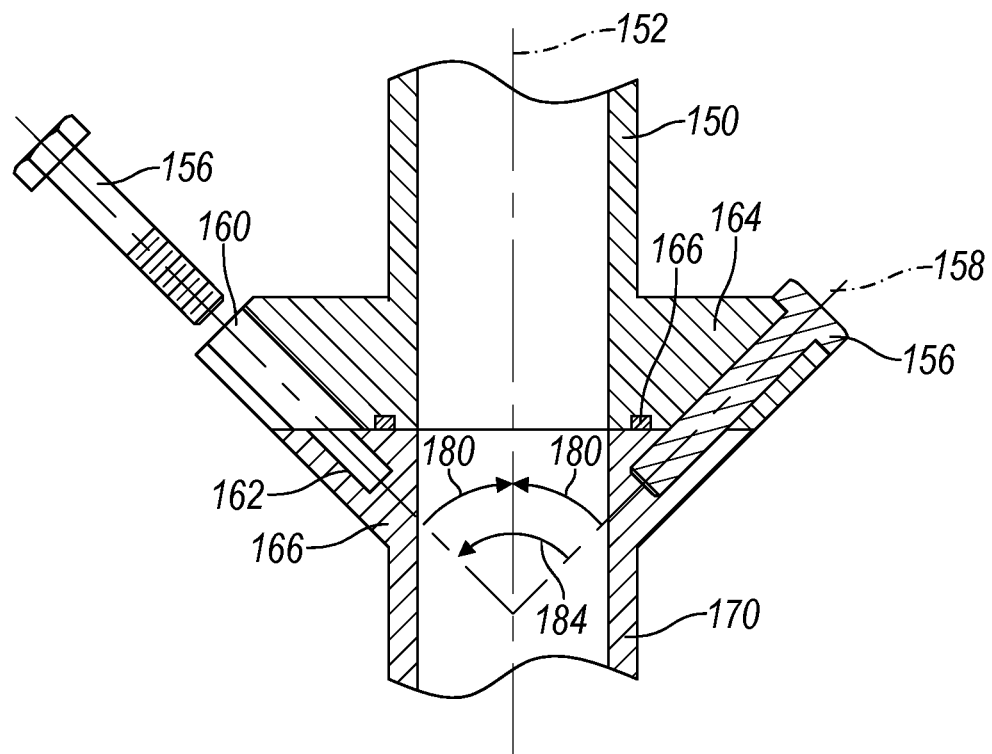

Tabs 68 and 78 in FIG. 3 are angled. FIG. 6 shows an alternative in which a duct 150 with a centerline 152 is coupled to a duct 170. Duct 150 has tabs 164 with through holes 160 through which fastener 156 can be placed. A gasket is provided that seals at the interface between ducts 150 and 170. Fasteners 162 are self tapping and form threads 162 in tabs 166 associated with duct 170. An axis of fastener 156 forms an angle 180 with respect to centerline 152. An angle of intersection between axes of fasteners 156 forms an angle 184 that is about a right angle. Fasteners 156 are angled an equivalent amount (shown as angle 180 in FIG. 6) from centerline 152. However, in an alternative embodiment, the angle associated with a left one of fasteners 156 needn't be the same as the angle associated with a right one of fasteners 156. Tabs 164 are webbed with duct 150, which provides greater rigidity to the joint. In an alternative embodiment, tab 164 doesn't have the full amount of webbing to save weight.

An ETB and an intake manifold are the elements in several of the embodiments. However, the present disclosure is applicable to any ducts coupled for conducting a fluid. The ducts are shown as straight. However, the ducts may be curved to accommodate packaging or other design considerations. It is the centerline over the straight portion adjacent to the interface of the coupled ducts against which the angle of the fasteners is defined.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. An intake system for an internal combustion engine, comprising:

an electronic throttle body (ETB) that is coupled to an intake manifold via at least one fastener, wherein the:

the ETB has a duct with at least one coupling element extending outwardly therefrom;

a through hole is defined in the coupling element of the ETB to accommodate each fastener;

the intake manifold has a duct with at least one coupling element extending outwardly therefrom;

the fastener passes through the through hole in the ETB and engages with threads defined in the coupling element of the intake manifold;

a central axis of one of the fasteners forms an angle with a centerline of the ETB of 15 to 135 degrees; and the tabs associated with the ETB extend from the duct of the ETB such that an outer face of the tabs forms an obtuse angle with respect to the duct of the ETB proximate the tabs.

2. The intake system of claim 1 wherein:

the at least one coupling element extending from the duct of the ETB comprises a plurality of tabs arranged around the periphery of the duct of the ETB;

the at least one coupling element extending from the duct of the intake manifold comprises a plurality of tabs that align with the tabs of the ETB when assembled; and a fastener is provided through each tab around the periphery of the duct of the ETB.

3. The intake system of claim 1 wherein:

the at least one coupling element extending from the duct of the ETB comprises a flange that encircles the duct and forms a surface of a conical frustum;

the at least one coupling element extending from the duct of the intake manifold comprises a flange that encircles the duct and forms a conical frustum; and an outer surface of the flange associated with the intake manifold mates with the flange associated with the ETB.

4. A joint adapted for conducting a fluid, comprising:

first and second ducts each having a plurality of tabs extending outwardly from its associated duct, a face of the tabs forming an obtuse angle with respect to its associated duct;

through holes defined in the plurality of tabs associated with the first duct; and threaded fasteners inserted into at least two of the through holes and threaded into tabs associated with the second duct.

5. The joint of claim 4 wherein the angle between the shaft of the threaded fastener and the surface of the first duct is in the range of 15 to 135 degrees.

6. The joint of claim 4 wherein shafts of two of the fasteners that are located in tabs that are across the duct from each other are roughly perpendicular.

7. The joint of claim 4 wherein the tabs of the first duct are part of a first flange and the tabs of the second duct are part of a second flange.

8. The joint of claim 7 wherein the first flange forms a surface of a conical frustum and the second flange forms a solid conical frustum.

9. The joint of claim 4 wherein the first duct and the second duct are comprised of plastic and the fasteners are comprised of metal.

10. The joint of claim 4 wherein the first duct is comprised of metal, the second duct is comprised of plastic, and the fasteners are comprised of metal.

11. The joint of claim 4 wherein a circular groove is defined in one of the first and second ducts; a circular gasket is placed in the circular groove; and the gasket is crushed when the fasteners are tightened so as to pull the first duct against the second duct.

12. The joint of claim 4 wherein one of the first and second ducts is part of an electronic throttle body and the other of the ducts is part of an intake manifold.

13. The joint of claim 4 wherein the first duct and the second duct have substantially the same inner diameter proximate a coupling of the first and second ducts.

14. A method of fabrication to form a fluid-conducting joint, comprising:

fabricating a first duct having tabs extending outwardly and through holes defined in the tabs, the first duct having a predetermined inner diameter;

fabricating a second duct having tabs extending outwardly, the inner diameter of the second duct being the predetermined inner diameter;

slipping metallic, threaded fasteners though the holes; and engaging threads of the fasteners with the tabs of the second duct wherein shafts of the fasteners form an acute angle with the first duct.

15. The method of claim 14 wherein one of the first and second ducts has a circular groove defined in a surface of the duct that faces the other of the ducts when assembled, the method further comprising:

installing a circular gasket into the circular groove prior to engaging the threads of the fasteners with the tabs associated with the second duct.

16. The method of claim 14 wherein one of the first and second ducts is a portion of an electronic throttle body and the other of the ducts is a portion of an intake manifold.

17. The method of claim 14 wherein centerlines of shafts of a pair of the fasteners are substantially perpendicular.

* * * * *